US006427723B2

(12) United States Patent
Bogdanowicz et al.

(10) Patent No.: US 6,427,723 B2
(45) Date of Patent: Aug. 6, 2002

(54) VALVE ARRANGEMENT HAVING INDIVIDUAL ELECTRICAL VALVE CONNECTION MODULES

(75) Inventors: Grzegorz Bogdanowicz; Siegfried Becker, both of Ostfildern; Richard Harscher, Aichwald, all of (DE)

(73) Assignee: Festo AG & Co., Esslingen (DE)

(*) Notice: Subject to any disclaimer, the term of this patent is extended or adjusted under 35 U.S.C. 154(b) by 0 days.

(21) Appl. No.: 09/808,607

(22) Filed: Mar. 14, 2001

(30) Foreign Application Priority Data

Mar. 17, 2000 (DE) ........................................ 100 13 192

(51) Int. Cl.[7] ................................................ F16K 31/06
(52) U.S. Cl. ....................................... 137/884; 137/271
(58) Field of Search ................................ 137/271, 269, 137/884

(56) References Cited

U.S. PATENT DOCUMENTS 4,399,836 A * 8/1983 De Versterre et al. ... 137/487.5
5,348,047 A 9/1994 Stoll et al.
6,192,938 B1 * 2/2001 Redemann et al. ......... 137/884

FOREIGN PATENT DOCUMENTS

| | | | |
|---|---|---|---|
| CH | 683021 | A5 | 12/1993 |
| DE | 3822340 | C2 | 3/1992 |
| EP | 0 664 402 | A1 | 7/1995 |

OTHER PUBLICATIONS

Festo Pneumatic brochure, Ventil–und Installationsineln (undated).

* cited by examiner

*Primary Examiner*—Kevin Lee
(74) *Attorney, Agent, or Firm*—Hoffmann & Baron, LLP

(57) ABSTRACT

A valve arrangement having an integral rail-like valve carrier body fitted with a plurality of valve units placed in a row or in-line. Each valve unit comprises a valve and at least one valve drive, the latter making electrical contact by way of a plug contact with electrical connector. Each valve is provided with its own connection module having the associated electrical connector, all connection modules being placed in a row free of mutual electrical control connection in sequence. Electrical conductors extend from each connection module and are in the form of flexible wire conductors.

19 Claims, 5 Drawing Sheets

VALVE ARRANGEMENT HAVING INDIVIDUAL ELECTRICAL VALVE CONNECTION MODULES

BACKGROUND OF THE INVENTION

The invention relates to a valve arrangement comprising an integral rail-like valve carrier body, on which a plurality of valve units are mounted sequentially aligned in the longitudinal direction of the valve carrier body alongside each other, such valve units respectively possessing a valve and at least one electrically operated valve drive, the valves being connected with fluid ducts extending in the valve carrier body and the valve drives being in electrical contact by way of plug contact means thereof with electrical connection means fixed in relation to the valve carrier body, such contact means being connected with externally connectable electrical lines serving for the transmission of control signals.

THE PRIOR ART

Valve arrangements of this type are for example disclosed in the brochure "Ventil- und Installationsinseln" No. 119, pages 8/9 of company Festo KG. In this case such valve arrangements comprise an integral, rail-like valve carrier body, which is detachably fitted with adjacently placed valve units arranged side by side, which respectively have one valve and at least one valve drive in the form of, for instance, an electromagnet or solenoid. A housing is mounted longitudinally of the valve carrier body and accommodates a printed circuit board extending in parallelism to the valve carrier body, such printed circuit board being fitted with electrical connection means. The valve drives of the individual valve units are respectively fitted with plug contact means which during assembly or fitting of the valves come into electrical contact with the electrical contact means so that owing to the presence of the printed circuit board an electrical connection may be produced with an electronic control means.

Although the known valve arrangement operates extremely reliably and renders possible highly rational manufacture and assembly, this is at the expense of complex manufacturing equipment which is consequently high in price, this having an unwanted effect on the selling price of the products.

SHORT SUMMARY OF THE INVENTION

One object of the invention is accordingly to create a valve arrangement of the type initially mentioned whose structure is cheaper to produce.

In order to achieve these and/or other objects appearing from the present specification, claims and drawings, in the present invention each valve is provided with its own connection module having the associated electrical connection means, the connection modules of all valves being placed in a row free of mutual electrical connection in the longitudinal direction of the valve carrier body and being separately secured to the valve carrier body, the externally connectable electrical lines being in the form of flexible wire conductors.

It is in this manner that the electrical connection means associated with the valve drives cease to be components of a printed circuit board with predetermined dimensions dictated by the number of valve units, and instead are provided on connection modules, which are associated with the separate valves in an individual fashion. Therefore during the manufacture and assembly of the valve arrangement it is possible to implement the necessary electrical connection measures simply by the use of a suitable number of connection modules, there being a great range of possible variation, since the connection modules do not have any interconnecting terminal means between them for the transmission of control signals. In order to provide valve arrangements with different numbers of valve units, it is accordingly possible to use a stock of indefinite length, i. e. a running length, for the valve carrier body which can be cut to size, the valve carrier body then being fitted with the required number of connection modules. Since in this respect the necessary manufacturing and assembly operations are relatively simple and do not necessarily involve the use of highly sophisticated manufacturing and assembly equipment it is possible for the valve arrangement to be produced on the whole at a relatively favorable price. Since the valve units are preferably secured on the valve carrier body independently of the connection modules, they may be very simply mounted or detached, the assembly or removal of the electrical plug connection involving the simultaneous making and, respectively, breaking of the plug connection between the plug contact means and the connection modules, since the latter remain on the valve carrier body.

Although the German patent publication 4,222,637 C2 discloses a valve arrangement, in the case of which the valve drives are in electrical contact with individual printed circuit boards for electrical operation, such printed circuit boards are however coupled together to form a signal distributor and also cascaded electrically for signal transmission, something which means that the number of the valve drives to be operated can not be varied completely freely, and is in fact predetermined by the configuration of the printed circuit boards. A further point is that the valve carrier body is divided up into individual segments, something which while permitting a high degree of adaptation for producing units of different overall length, simultaneously means that there is a relatively large amount of assembly complexity.

Further advantageous developments of the invention are defined in the claims.

In the case of a particularly advantageous embodiment each connection module comprises a principal body of plastic material, which for example may be produced by molding at an extremely low price and which serves as the support for the connection means. In this case it is possible for the connection means to be individually permanently integrated or, preferably, to be in the form of components of a connection plug detachably fixed on the respective principal body, which plug may alternatively be employed as a simple electric valve plug. Accordingly for the design of the valve arrangement it is possible to have recourse to components, which alternatively can be employed for other purposes in order in this manner to lead to a further saving in costs by the employment of uniform parts.

All connection modules are preferably designed in the form of individual, self-contained components which are installed in accordance with the desired number thereof. As an alternative it would be possible to have the principal bodies in the form of readily separable component of a principal body strand, that is to say for example a strand-like arrangement of principal bodies in a row and with predetermined points of weakness between them at which they can be broken off as required.

If the valve units of the valve arrangement are to be electrically operated individually in a particular application, it is preferred to utilize a design in which the flexible wire conductors, serving for external connection as electrical conductors are respectively individually extended or directed away from the connection modules and from the valve arrangement. In the case of an alternative design for this purpose the flexible wire conductors on board the valve arrangement lead to interface means, whence a central electrical connection with an external electronic control means is possible, for instance using a field bus connection or a multi-pole connection. The central interface means may however itself be fitted with an electronic control unit.

In order to secure the connection modules on the valve carrier body the latter may be provided with a holding rail, on or in which the connection modules are placed in a row. The holding rail is preferably an integral component of the valve carrier body so that on cutting the valve carrier body to the desired length the correct length of the holding rail is automatically produced.

On the holding rail it is possible to provide one or more anchoring grooves, into which the connection modules fit. Moreover, the holding rail can have a recess extending in the longitudinal direction of the valve carrier body, into which the connection modules at least partly fit so that there is a reliable locking in place in conjunction with protection against damage and simultaneously compact dimensions of the overall arrangement.

In the case of a valve carrier body with, essentially , a rectangular cross section the recess may be provided in the corner region as recess aligned with the corner. Inserted connection modules consequently continue to be readily accessible. Furthermore, the flexible wire conductors may be readily caused to extend away from the each individual connection module without hindrance by the valve carrier body.

In the case of a further embodiment of the invention the recess is groove-like, the alignment preferably being such that the longitudinal groove opening is aligned in the same direction as the component carrying face of the valve carrier body, on which the valve units are seated with their valves. The groove opening is accordingly turned toward the valve drives, something favoring the automatic production and interruption of the electrical plug connection between the valve drives and the connection modules on assembly and disassembly of the valve units.

The flexible wire conductors may if necessary be laid in the recess, and covered over by the connection modules. This design is particularly to be recommended when a central interface means is additionally arranged on the holding rail. It is then possible to provide flexible electrical connections, which are invisible from the outside, between the connection modules and the central interface means.

Using end pieces fitted in the recess in the holding rail, which flank the row of connection modules on all sides, it is possible for the connection modules to fixed in place in a particularly simple fashion so that their longitudinal position is set in relation to the valve carrier body.

Preferably, the connection module are mounted on the valve carrier body by being thrust from the one end of the valve carrier body into at least one anchoring groove, extending in the longitudinal direction and/or one recess having a similar shape.

The valve carrier body could be in the form of an injection molding and consist of synthetic resin material. In the case of an alternative design the valve carrier body consists of aluminum material and is in the form of an extrude in the case of which attachment means, extending along the constituent length of the valve carrier body, may be provided for the connection modules in a particularly simple manner.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 1:
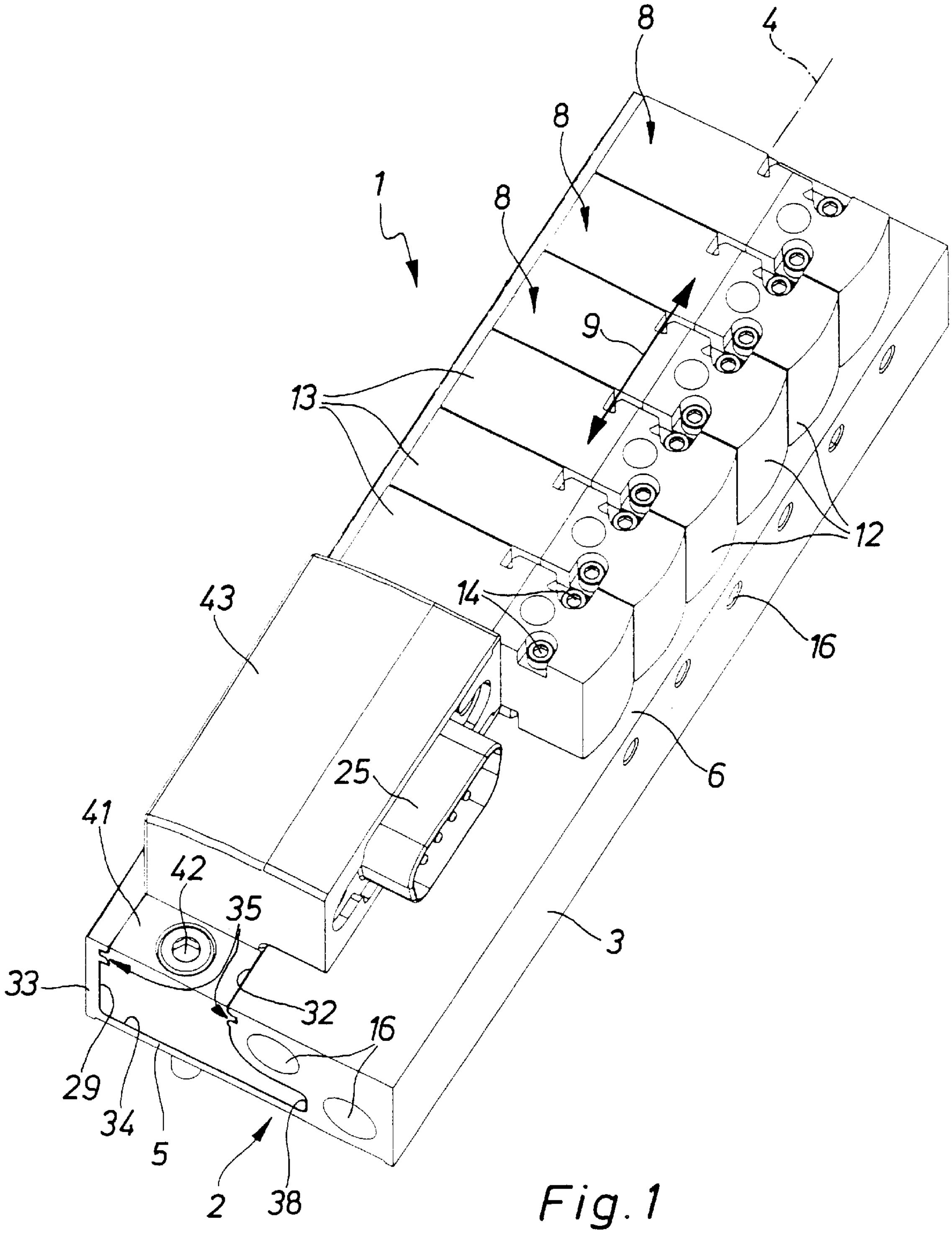
FIG. 1 shows a first preferred embodiment of the valve arrangement in accordance with the invention in perspective view looking downward.

The valve arrangements generally referenced 1 in the drawing respectively comprise an elongated valve carrier 2 with a tabular or plate-like, flat rail-like valve carrier body 3, which sets the overall length of the valve arrangements 1. The valve carrier body 3 is an integral component and may for example be an extrude consisting of an aluminum material. As compared with a synthetic resin material shaped by injection molding for example, production by extrusion does offer the advantage of being able to provide an extremely wide range of different lengths. It is more particularly possible to produce the valve carrier bodies by cutting off from stock of indefinite length, that is to say cut to the desired length for a particular application. While doing without complex assembly operations necessary for individual component it is possible to produce with extremely different overall lengths.

The valve carrier body 3 comprises a holding rail 5 extending in the longitudinal direction 4 thereof and a component mounting section 6, extending alongside it, with the same longitudinal alignment. The holding rail 5 and the component mounting section 6 are connected together integrally and accordingly an integral component of the valve carrier body 3.

On a longitudinal side, here referred to as the component mounting side, of the valve carrier body 3 a plurality of valve units 8 are so mounted that in the longitudinal direction 4 of the valve carrier body 3 they are alongside one another. There is accordingly a row or in-line configuration of the valve units 8, whose row direction 9, as indicated by the double arrow, extends in parallelism to the longitudinal axis 4 of the valve carrier body 3.

Each valve unit 8 constitutes a constructional unit comprising a valve 12 and at least one electrically operated valve drive 13 serving for activation of the valve 12. Any suitable design of the valves 12 is possible, 2/2 way valves being employed in the working example, each valve having a single valve drive 13.

As a valve drive it is more particularly possible to provide electromagnet or preferably piezoelectric drives. Such drives may directly operate the valve 12 or act on a pilot valve serving the valve 12.

The valves 12 of the valve units 8 are mounted on the component mounting side at a component mounting face 7 of the valve carrier body 3 using seals, not illustrated in detail. In order to provide for detachability attachment screws 14 are employed, which extend through the valve housing of each valve 12 and are screwed into threaded holes in the component mounting section 6. Other attachment means would also be conceivable, for instance using locking slides and/or detent joints and catches.

Each mounted valve 12 communicates with fluid ducts 16 extending in the interior of the valve carrier body 3. In this respect it is a question of a supply duct 16*a*, a venting duct 16 and a power duct 16*c* in the working example. In accordance with the position of switching of an individual valve caused by the valve drive 13, such valve is able to connect individually associated power duct 16*c* selectively with the supply duct 16*a* or with the venting duct 16*b*, the respectively other duct being closed. A load, as for instance a fluid operated drive, may thus be supplied with the pressure medium, more particularly compressed air, or be vented.

All valves 12 are centrally supplied and vented. For this purpose the component mounting section 6 has the supply duct 16*a* and the venting duct 16*b* extending through it in the longitudinal direction 4, branch ducts extending from such ducts in the interior of the component mounting section 6, such branching ducts terminating at first duct openings 17 for flow to the individual regions of the component mounting face 7 bearing the valve 12. The supply and removal of the compressed air takes place here centrally at one face of the valve carrier body 3.

Further, second duct terminations 18 or ports provide at the individual component mounting regions respectively communicate with a power duct 16*c*, which more particularly extends along a longitudinal side of the valve carrier body 3, where it renders possible connection with a fluid duct leading to a load.

Using the valves 12 it is possible for the first and second duct ports 17 and 18 on a respective component mounting region to be so joined together that the above mentioned operational states are produced.

The valve drives 13 are so laterally mounted on the respectively associated valve 12 that they extend athwart the row direction 9 into the region with the holding rail 5 and more particularly above same. In this case plug contact means 19 provided on the valve drives 13 are electrically connected with electrical contact means 22 mounted on the valve carrier body 3. The term "plug contact means" is employed herein as well in the sense of purely touching contact means.

The electrical connection means 22 in electrical contact with a respective valve drive 13 are respectively a common component of a self-contained connection module 23 so that for each valve unit 8 there is one such connection module 23, which has the respective electrical connection means 22. Electrical conductors in the form of flexible wire conductors 24 extend from each of these connection means 23 to serve for the transmission of control signals, such conductors being connected at one end with the electrical connection means 22 of the respective connection module 23 and at the other end being able to be connected with any desired electrical means, whose design will be dependent on the specific application.

Figure 3:
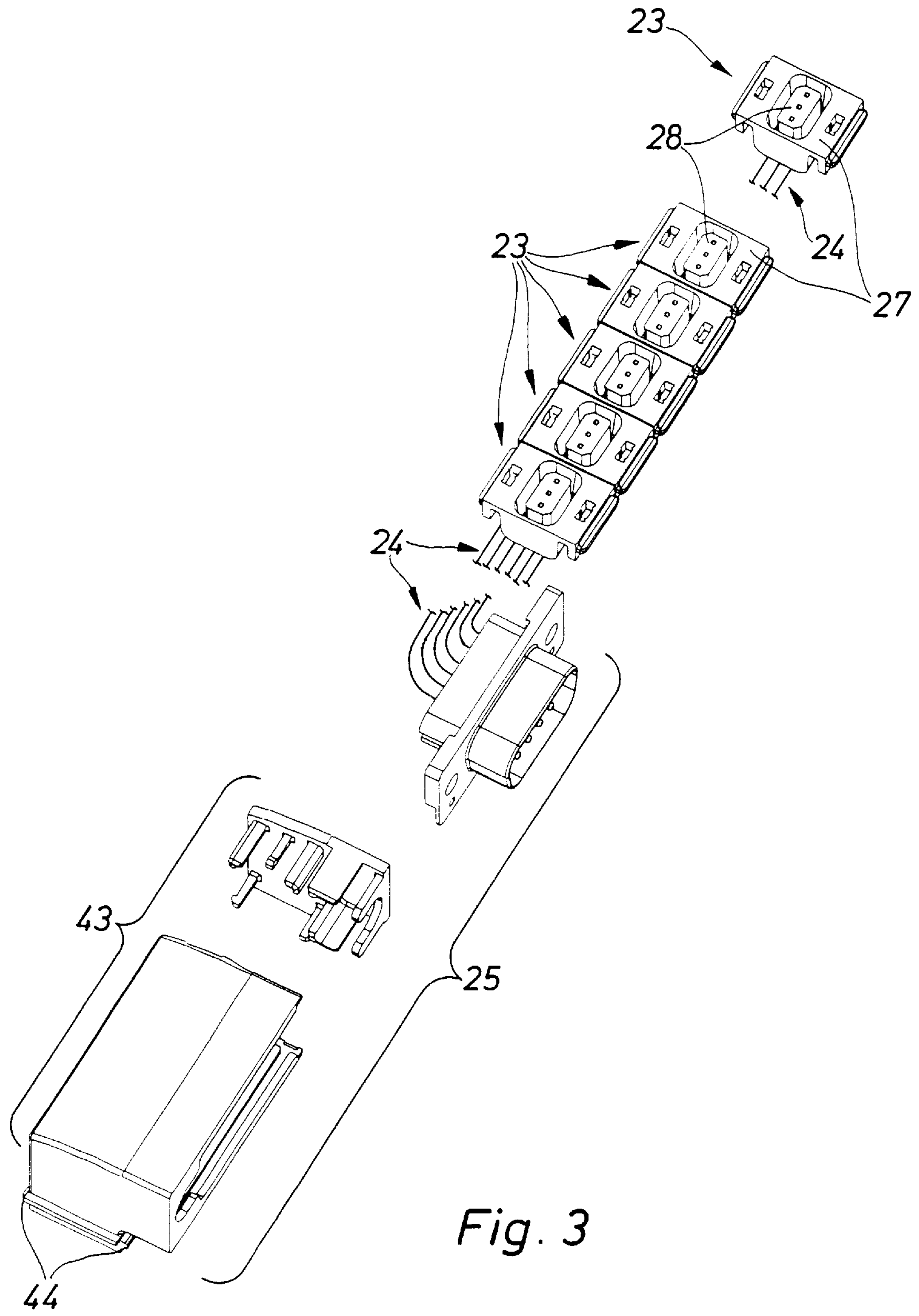
FIG. 3 is an individual view of the arrangement provided in accordance with FIGS. 1 and 2 in the valve arrangement with connection modules and a central interface means.
Figure 4:
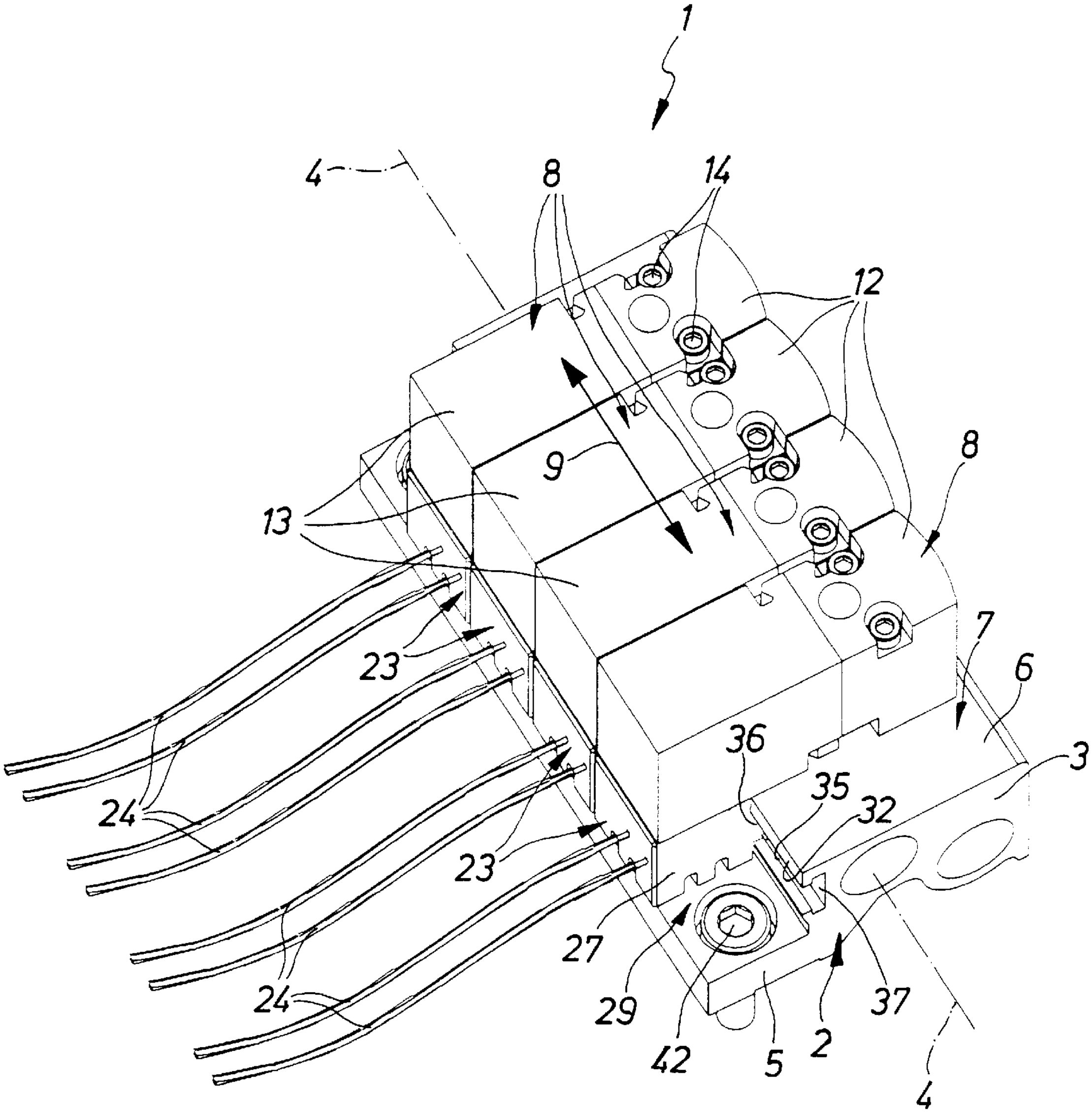
FIG. 4 shows a preferred embodiment of the valve arrangement in accordance with the invention in perspective.
Figure 5:
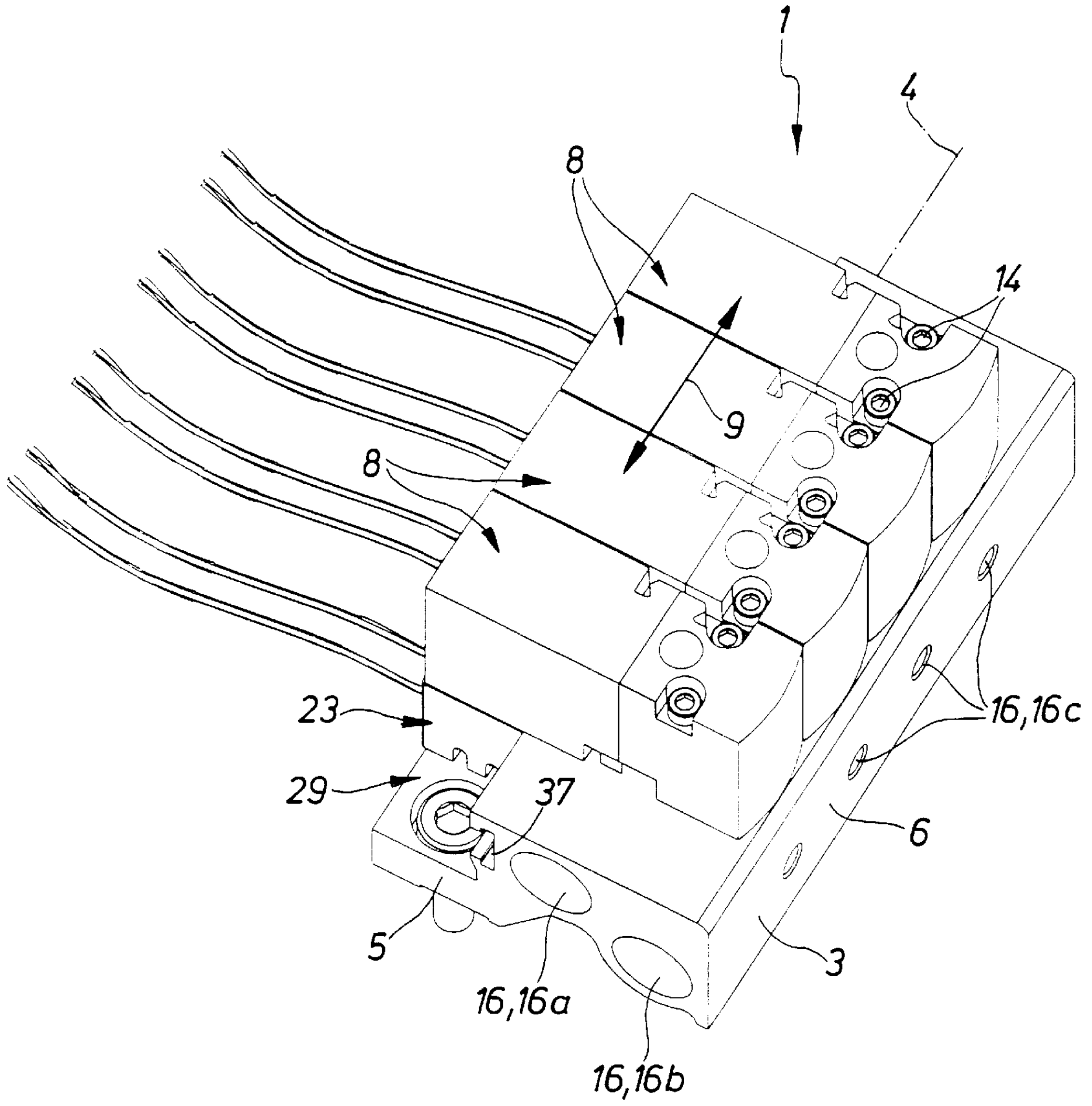
FIG. 5 shows the valve arrangement of FIG. 4, again in perspective but with a different angle of viewing.

In the working embodiment illustrated in FIGS. 4 and 5 the flexible wire conductors 24 extend away from the individual connection modules 23 separately, while simultaneously extending away from the valve arrangement 1, for instance to an external electronic control means, which supplies the control signals for specific actuation of the valve drives 13. On the contrary the flexible wire conductors 24 in the working example of the invention of FIGS. 1 through 3 on board the valve arrangement 1 to run a central interface means 25 as a part thereof, whence connection with external means is possible in a central manner. In this case as well the external means may be constituted by an electronic control means, which supplies electrical control signals for operation or, respectively, actuation of the valve drives 13.

In the working embodiment the central interface means 25 comprises a multi-pole plug device 26 for the connection of a central cable extending to external means. As an alternative a field bus connection means would be possible, in which case the central interface means 25 could be conveniently provided with a suitable field bus unit, which passes on the incoming signals with the proper coordination to the individual connection modules 23 and the valve drives 13 associated with them.

It is furthermore readily possible to design the central interface means 25 itself with an electronic control unit serving for the operation of the valve drives 13, and more particularly with a programmable control means, which could be individually programmed in accordance with the case of application.

The individual connection modules 23 are arranged in a row extending in the longitudinal direction 4 of the valve carrier body 3 on or in the holding rail 5, same making direct contact with one another without however having any mutual electrical control connection with one another, that is to say, they are not cascaded for control purposes. The electrical control signals operating the valves by actuating same are individually supplied by way of the flexible wire conductors 24, it being possible to provide a zero conductor and/or the necessary electrical power supply by way of these flexible wire conductors in an individual manner. For the purposes of having a common zero conductor and/or a common power supply it would however be possible to also provide direct electrical connections between the connection modules 23, again preferably using flexible wire conductors.

The connection modules 23 are individually secured to the valve carrier body 3 so that they do not necessarily have to be connected together mechanically, even although this would be possible. The connection module 23, which are preferably plate- or block-like—in the working example of FIGS. 4 and 5 they have the form of cubes—preferably have a principal body 27 more particularly manufactured of synthetic resin material, such body being provided with the electrical connection means 22. In this respect the connection modules 23 are so placed in sequence that their principal bodies 27 make direct contact with one another without however fitting together in an interlocking manner in any way.

The electrical connection means 22 may be directly secured to the associated principal body 27. In the working embodiment the connection modules 22 provided for each connection module 23 are however a component of a plug connection 28, which more especially is detachably secured to the associated principal body 27, for example by a catch. This design possesses the advantage that the connection plug 28 may also be employed independently of the principal body 27 as a simple valve plug for making electrical contact with a valve drive and thus opens up the possibility of making electrical connection or contact with valve arrangements of the type in accordance with the invention and also other designs on the basis of identical connection plugs 28. This means that the costs of manufacture are reduced.

In the working embodiment all connection modules 23 are in the form of individual, separate components. However a design would be conceivable in the case of which the principal bodies would be in the form of readily separated components of strand or bar of principal bodies. Here a strand structure could be employed composed of principal bodies with points of intentional weakness, production of such a strand being by injection molding with the points of intentional weakness being defined by regions where the material is thinner. The principal bodies could then be separated separately or still joined together in a group and be installed separately or still joined together on the valve carrier 2.

In order to produce a valve arrangement with a predetermined number of valve units 8, it is possible simply to utilize a valve carrier body 3 with a suitable length, which is then fitted with a corresponding number of connection modules 23. Since the latter are not joined together, i. e. contacted, electrically practically any number of connection modules 23 may be employed, something which renders possible great adaptability as regards the production of customized valve arrangements.

The working examples do share the point in common that in its section constituting the holding rail the valve carrier body 3 there is a recess 29 extending along the full length of the valve carrier body 3 in the longitudinal direction 4 thereof, in which recess the connection modules 23 fit completely or partly. In the working embodiment the arrangement is such that the connection modules 23 are completely taken up in the recess 29 so that they may be securely held in place and overall dimensions are compact.

Figure 2:
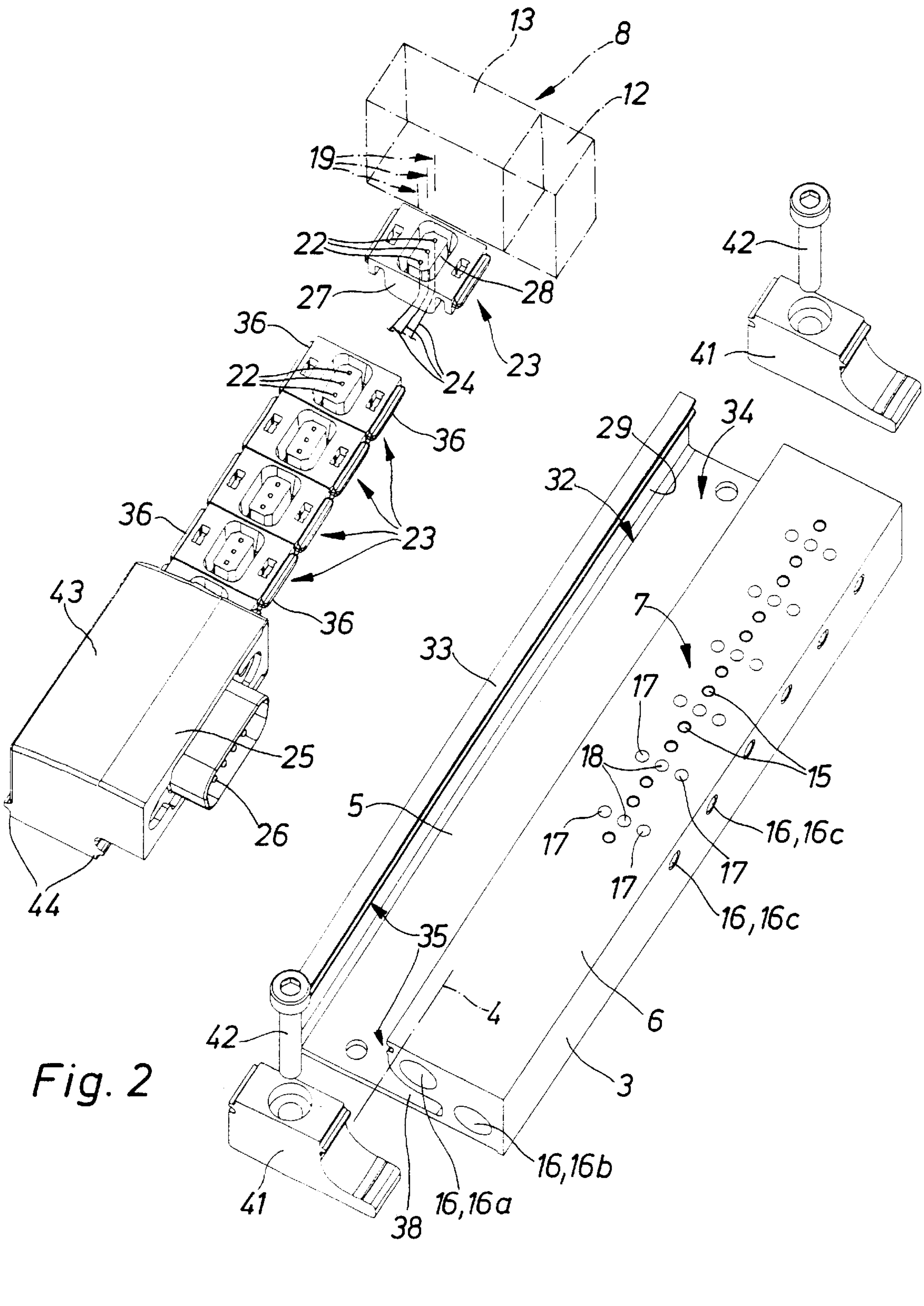
FIG. 2 shows the valve arrangement of FIG. 1 in an exploded view, only one of the valve units being indicated in chained lines.

In all the working examples illustrated the valve carrier body 3 is substantially rectangular in cross section. Such basic structure or protrusions, if this should be in accordance with requirements. In any case the recess 29 in the working embodiment of FIGS. 4 and 5 is in a corner region of the valve carrier body 3 so that one may speak of a recessed corner. On the contrary the recess 29 in the working embodiment of FIGS. 1 through 3 is like a groove, the longitudinal opening 32, which extends along the full length of the valve carrier body 3, having the same alignment as the component mounting face 7. In other words, the longitudinal opening 32 of the recess 29 faces the valve drives 13 extending past it, something which furthermore applies for the designs of FIGS. 4 and 5.

The two working examples share the feature that the longitudinal opening 32 of the recess 29 is so placed that it runs flush with the component mounting face 7 in a common plane. There are differences between the two designs to the extent that the recess 29 of FIGS. 4 and 5 is also open toward the longitudinal side opposite the component mounting section 6, whereas in FIGS. 1 through 3 a limb 33 of the holding rail 5 is located here, which together with the component mounting section 6 constitutes the two longitudinal limits of the groove-like recess 29.

Since the recess 29 in the design of FIGS. 4 and 5 is open on the rear side opposite to the component mounting section 6 the flexible wire conductors 24 may be quite readily trained away past this rear side from the valve arrangement 1. Such conductors may extend athwart the longitudinal direction 4 away from the valve carrier body 3.

On the other hand the design of FIGS. 1 through 3 does offer the opportunity of laying the flexible wire conductors 24 out of sight in the interior of the recess 29 and for example to a flexible electrical conductor connection between the individual electrical connection means 22 and the central interface means 25. While in the case of the design of FIGS. 4 and 5 the cross section of the recess 29 is completely taken up by the respective connection module 23, in the case of FIGS. 1 through 3 a design of the connection modules 23 is used, in the case of which same merely occupy the top part of the recess 29 associated with the longitudinal opening 32 so that between them and the base face 34, opposite to the longitudinal opening 32, of the recess 29 a free space is left, wherein the flexible wire conductors 24 may be readily laid. The wire conductors 24 are then covered over by the connection modules, which close the recess 29 at the longitudinal opening 32 practically like a lid.

The flexible wire conductors 24 may in all cases be commercially available insulated wires or cables in order to prevent short circuiting when they come into contact with each other.

In order to secure the connection modules 23 in the specially allotted recess 29 individually the holding rail 5 is provided with one anchoring groove in the case of the design of FIGS. 4 and 5 and in the case of the design of FIGS. 1 through 3 with two anchoring grooves 35. Such anchoring grooves extend along the full length of the valve carrier body 3 in the longitudinal direction 4 thereof. Each connection module 23 is provided with an anchoring structure 36 fitted into the anchoring groove 35 in an interlocking fashion.

In the case of the anchoring groove 35 it may, as in the embodiments of FIGS. 4 and 5 be a question of an undercut longitudinal groove, for example a dove-tail groove or a T-groove or slot. As shown in FIGS. 4 and 5 a respective connection module 23 has its anchoring structure 36 so fitted into the anchoring groove 35 that it is securely held in the transverse direction of the anchoring groove 35 and can only be introduced and removed through the terminal groove openings 37 at the terminal faces or ends of the valve carrier body 3. The connection modules 23 are therefore secured by insertion from one of the valve carrier body 3 on the valve carrier body 3 for assembly.

The situation is similar in the case of the embodiments of the invention depicted in FIGS. 1 through 3, in which case however there are no undercut anchoring grooves 35, because the connection modules 23 simultaneously fit into two anchoring grooves 35. These two anchoring grooves 35 are located at the side faces delimiting the recess 29 on the one hand of the limb 33 and on the other hand of the component mounting section 6. It is preferred for them to be at the longitudinal opening 32, it being possible for them to be opposite to each other in the transverse direction of the recess 29. The principal bodies 27 of the connection modules 23 are provided on opposite sides with anchoring structures 36 constituted by projections and for instance in the form of ribs or rail-like means, which are fitted into the two anchoring grooves 35, same being introduced from one end face of the valve carrier body 3 into the end openings of the anchoring grooves 35 for assembly.

Owing to the resulting anchoring of the connection modules 23 same are fixed in an immovable manner athwart the longitudinal direction 4 of the valve carrier body 3. By displacement along the anchoring grooves 35 and, respectively, the recess 29 they may however be positioned at the desired point adjacent to the associated valve drive 13. By suitable adaptation of the dimensions it is possible to obtain a certain degree of stiffness ensuring that the connection modules 23 are held at the desired point axially immovably by friction. Accordingly once the plugged connection between the plug contact means 19 like pins in the embodiment and the complementary electrical connection means 22 has been made, there is a resulting automatic locking of the connection modules 23 in place.

In the working embodiment illustrated in FIGS. 1 through 3 end pieces 41 are fitted and locked in the recess 29 at the two axial terminal regions thereof, which end pieces respectively adjoin the row of connection modules 23 in each case at the end and keep them in place. Attachment means 42 can be fitted through the end pieces 41 as well, which serve to hold end pieces 41 on the valve carrier body 3 and using the entire valve carrier 2 may be secured to a holding structure which is not illustrated in detail.

In order to have sufficient space inside the recess 29 for laying flexible wire conductors 24 the recess 29 may have a longitudinal widened part 38, which extends into the component mounting section 6 and thus practically occupies the supply duct 16*a* and/or the venting duct 16*b*. In this case the end pieces 41 will conveniently have a matching cross sectional form.

The central interface means 25 may be held in place in the same manner as the connection module 23 on the holding rail 5. As shown in FIGS. 2 and 3, the central interface means 25 has a housing 43 for this purpose, which at its lower face has longitudinal anchoring parts 44, whose distance apart and cross sectional shape are the same as the anchoring structures of the connection modules 23. This means that the housing 43 may be inserted like the connection modules into the recess 29 with a simultaneous interlocking engagement of the anchoring structures 44 and the anchoring grooves 35. The housing 43 then assumes a position above the valve carrier body 3 in alignment with the row of valve units 8. Here the central interface means 25 is preferably associated with one of the axial terminal regions of the valve carrier 2.

What is claimed is:

1. A valve arrangement comprising:

an integral valve carrier body, on which a plurality of valve units are mounted sequentially aligned in the longitudinal direction of the valve carrier body alongside each other, such valve units respectively possessing a valve and at least one electrically operated valve drive, the valves being connected with fluid ducts extending in the valve carrier body and the valve drives being in electrical contact by way of plug contacts with electrical connection means fixed in relation to the valve carrier body, the electrical connection means being connected with externally connectable electrical lines serving for the transmission of control signals, wherein each valve is provided with its own connection module having the associated electrical connection means, the connection modules of all valves being placed in a row free of mutual electrical connection in the longitudinal direction of the valve carrier body and being separately secured to the valve carrier body, the externally connectable electrical lines being flexible wire conductors.

2. The valve arrangement as set forth in claim 1, wherein each connection module comprises a principal body of synthetic resin material, which has the electrical connection means.

3. The valve arrangement as set forth in claim 2, wherein the electrical connection means include components of a connection plug detachably secured to the principal body.

4. The valve arrangement as set forth in claim 2, wherein the principal bodies are manufactured as readily separated pieces of a principal body strand.

5. The valve arrangement as set forth in claim 1, wherein all connection modules are individual self-contained components.

6. The valve arrangement as set forth in claim 1, wherein the flexible wire conductors extend from the individual connection modules and from the valve arrangement.

7. The valve arrangement as set forth in claim 1, wherein the flexible wire conductors on board the valve arrangement run to a central interface means, whence an electrical connection more particularly with an external electronic control means is possible.

8. The valve arrangement as set forth in claim 7, wherein the central interface means comprises an electronic control unit and/or a field bus unit.

9. The valve arrangement as set forth in claim 1, wherein the connection modules are arranged in a row on or in a holding rail extending in the longitudinal direction of the valve carrier body, such rail being an integral component of the valve carrier body.

10. The valve arrangement as set forth in claim 9, wherein the holding rail comprises at least one anchoring groove extending in the longitudinal direction of the valve carrier body, into which an anchoring structure of the connection modules may fit.

11. The valve arrangement as set forth in claim 9, wherein the holding rail comprises a recess extending in the longitudinal direction of the valve carrier body, into which recess the connection modules are at least partially fitted.

12. The valve arrangement as set forth in claim 11, wherein the recess is provided in a corner region of the valve carrier body.

13. The valve arrangement as set forth in claim 11, wherein the recess is a groove, its longitudinal opening facing the valve drives.

14. The valve arrangement as set forth in claim 11, wherein the flexible wire conductors are laid in the recess and concealed by the connection modules.

15. The valve arrangement as set forth in claim 11, wherein the connection modules close the recess in the manner of a cover on the longitudinal side thereof.

16. The valve arrangement as set forth in claim 11, wherein the row of connection modules is secured between the end pieces fitted in the recess.

17. The valve arrangement as set forth in claim 9, wherein the connection modules are able to be secured in place by insertion assembly or sliding into place taking place from one end of the valve carrier body.

18. The valve arrangement as set forth in claim 9, wherein the central interface means is secured in place in the same manner as the connection modules on the holding rail.

19. The valve arrangement as set forth in claim 1, wherein the valve carrier body is an extrude or an injection molding.

* * * * *